United States Patent
Lasaulce et al.

(10) Patent No.: US 10,397,881 B2
(45) Date of Patent: Aug. 27, 2019

(54) METHOD OF COORDINATING RADIO TRANSMITTERS BASED ON A CODING OF LEVEL OF POWER TRANSMITTED AND CORRESPONDING TRANSMITTER

(71) Applicant: Orange, Paris (FR)

(72) Inventors: Samson Lasaulce, Crehange (FR); Vineeth Satheeskumar Varma, Bures sur Yvette (FR); Raphael Visoz, Vanves (FR)

(73) Assignee: ORANGE, Paris (FR)

( * ) Notice: Subject to any disclaimer, the term of this patent is extended or adjusted under 35 U.S.C. 154(b) by 108 days.

(21) Appl. No.: 15/100,529

(22) PCT Filed: Nov. 27, 2014

(86) PCT No.: PCT/FR2014/053062
§ 371 (c)(1),
(2) Date: May 31, 2016

(87) PCT Pub. No.: WO2015/079174
PCT Pub. Date: Jun. 4, 2015

(65) Prior Publication Data
US 2016/0302157 A1    Oct. 13, 2016

(30) Foreign Application Priority Data
Nov. 29, 2013    (FR) .................................... 13 61885

(51) Int. Cl.
*H04J 11/00*    (2006.01)
*H04W 52/24*    (2009.01)
(Continued)

(52) U.S. Cl.
CPC ........ *H04W 52/241* (2013.01); *H04B 17/336* (2015.01); *H04J 11/0053* (2013.01);
(Continued)

(58) Field of Classification Search
CPC ... H04W 52/241; H04W 16/32; H04W 52/34; H04W 52/24; H04W 84/12; H04L 67/12; H04B 17/336; H04J 11/0053
(Continued)

(56) References Cited

U.S. PATENT DOCUMENTS

| | | | |
|---|---|---|---|
| 2004/0058687 A1* | 3/2004 | Kim | H04L 1/0026 455/452.2 |
| 2010/0142462 A1* | 6/2010 | Wang | H04B 7/024 370/329 |
| 2012/0083201 A1* | 4/2012 | Truong | H04W 52/46 455/9 |

OTHER PUBLICATIONS

IEEE802.11 "Part 11: Wireless LAN Medium Access Contril (MAC) and Physical Layer (PHY) Specifications—Amendment 5: Enhancements for Higher Throughput" Oct. 29, 2009.
(Continued)

*Primary Examiner* — Mang Hang Yeung
(74) *Attorney, Agent, or Firm* — David D. Brush; Westman, Champlin & Koehler, P.A.

(57) ABSTRACT

A method of coordinating a transmitter with K−1 transmitters of a group of K transmitters. The K transmitters are in communication respectively with K receivers via channels that are described, for a frequency band m by direct transmission channel gains ($g_{ji,m}$) when j=i and by interfering transmission channel gains ($g_{ji,m}$) when j≠i between the transmitter j and the receiver i, i∈{1, . . . , K}, j∈{1, . . . , K}, K>1. Each transmitter has available an estimate of the direct channel gain and estimates of the gains of channels interfering with its receiver. The method includes an "exchange" stage during which the K transmitters transmit simultaneously K respective sequences of subframes of respective power levels per band m coding the estimated channel gains ($\hat{g}_{ji,m}$) and during which the K transmitters receive, after each subframe, signal to interference plus
(Continued)

noise ratios as returned by the K receivers to their respective transmitters.

12 Claims, 2 Drawing Sheets

(51) Int. Cl.
  *H04W 52/34* (2009.01)
  *H04B 17/336* (2015.01)
  *H04L 29/08* (2006.01)
  *H04W 16/32* (2009.01)
  *H04W 84/12* (2009.01)

(52) U.S. Cl.
  CPC .............. *H04L 67/12* (2013.01); *H04W 16/32* (2013.01); *H04W 52/24* (2013.01); *H04W 52/34* (2013.01); *H04W 84/12* (2013.01)

(58) Field of Classification Search
  USPC ........................................................ 370/203
  See application file for complete search history.

(56) References Cited

OTHER PUBLICATIONS

G. Scutari, et al., "The MIMO iterative waterfilling algorithm", IEEE Transactions on Signal Processing, vol. 57, No. 5, pp. 1917-1935, May 2009.

Robert M. Gray et al., "Quantization", IEEE Transactions on Information Theory, vol. 44, No. 6, Oct. 1998.

IEEE802.11 "Part 11: Wirelss LAN Medium Access Contril (MAC) and Physical Later (PHY) Specifications", Mar. 29, 2012.

International Search Report dated Mar. 4, 2015 for corresponding International Application No. PCT/FR2014/053062, filed Nov. 27, 2014.

English Translation of the International Written Opinion dated Mar. 4, 2015 for corresponding International Application No. PCT/FR2014/053062, filed Nov. 27, 2014.

French Search Report and Written Opinion dated Jul. 7, 2014 for corresponding French Application No. 1361885, filed.

Larrousse et al., "Coded Power Control: Performance Analysis", 2013 IEEE International Symposium on Information Theory, IEEE, Jul. 7, 2013 (Jul. 7, 2013), pp. 3040-3044, XP032497193.

\* cited by examiner

METHOD OF COORDINATING RADIO TRANSMITTERS BASED ON A CODING OF LEVEL OF POWER TRANSMITTED AND CORRESPONDING TRANSMITTER

CROSS-REFERENCE TO RELATED APPLICATIONS

This application is a Section 371 National Stage Application of International Application No. PCT/FR2014/053062, filed Nov. 27, 2014, the content of which is incorporated herein by reference in its entirety, and published as WO 2015/079174 on Jun. 4, 2015, not in English.

FIELD OF THE INVENTION

The present invention relates to the field of telecommunications. Within this field, the invention relates to techniques for coordinating transmitters (whether using the same technology or different technologies) that are making use of common radio resources in the same geographical zone, i.e. in a zone where communications by one transmitter disturb communications by another, where there is said to be an interference phenomenon. The invention lies in the context of a telecommunications system having K transmitters and K receivers that communicate respectively with the K transmitters. A transmitter may equally well be a base station or an access point to an access network.

The interference phenomenon can be limited by coordination mechanisms controlled by a central communications entity, providing there exists an infrastructure, or "backhaul", to convey the control and signalling signals between the transmitters, the receivers, and the central entity. Nevertheless, such mechanisms consume bandwidth. Also, such an infrastructure is absent when a transmitter is making use of a frequency band without a "free band" license (or "white space") and so there can be no possible coordination. In particular concerning transmissions based on Wi-Fi type wireless technology that rely on standards of the IEEE 802.11 series, their quality is threatened by the explosion in the number of things in communication with the Internet of things (IoT) and by the explosion of distribution networks with automatic return of information (smart grids). Cellular networks are not free of this risk, since the trend for future deployments consists in deploying small, or "femto", cells between base stations in order to increase capacity while limiting backhaul infrastructure, which goes against the need for coordination mechanisms to combat interference.

PRIOR ART

In the context of the invention, communications between transmitters and receivers are considered as passing via a so-called "equivalent" channel. The term equivalent channel is used to cover both the propagation channel itself and also the linear filtering operations that take place on transmission and on reception and that lead to the mathematical structure of the signal to noise plus interference ratio that is used. Below, the generic term "channel" is used instead of and replacing the term "equivalent channel". The term "gain" is used relative to an (equivalent) channel to designate the square of the modulus of the dominant coefficient of the impulse response of the channel, the square of the modulus of the frequency response of the channel for a frequency m, or indeed the ratio between the signal power received by the receiver over the entire band m and the transmitted power, i.e. the ratio that would be measured if there were no interference from other transmitters. The "channel" or "frequency" index m may take any one value selected from M values. The term "M" is used to designate the number of return channels available for the communications system under consideration, each return channel being characterized by its own signal to noise plus interference ratio SINR.

From [1], it is known to use a transmitted power pattern that can provide a basis for channel measurements that can be returned at the end of each transmitted power level.

From [2], an algorithm is known for allocating power transmitted by a transmitter during communication with a receiver via a point-to-point link. That algorithm is known as the iterative waterfilling algorithm (IWFA). Power is allocated between the M orthogonal channels of the point-to-point link while making use solely of knowledge about the signal to interference plus noise ratio (SINR) that is known for each of these frequency channels, M≥1. The channel gains/coefficients are assumed either to be constant or else to be piecewise constant. Under such circumstances, the channel gains are thus steady over a duration referred to as the coherence time Tc. In a preferred mode, the IWFA operates on a duration T shorter than or equal to the coherence time, T≤Tc. The algorithm considers a telecommunications system with K transmitters and K receivers, K≥2. The IWFA algorithm subdivides time into successive frames, and each frame has K subframes. The duration of a frame corresponds to the duration of an iteration of the IWFA algorithm. A transmitter can update the allocated power only once per frame. The frame thus corresponds to the minimum duration needed to enable the K transmitters to update their allocated powers. The algorithm considers an arbitrary order between the transmitters for updating their powers. Without loss of generality, the transmitter 1 is the transmitter that updates first, and so on. The IWFA algorithm implicitly assumes a frame level synchronization mechanism (outer loop) and a timeslot level synchronization mechanism corresponding to a subframe (inner loop).

Figure 1:
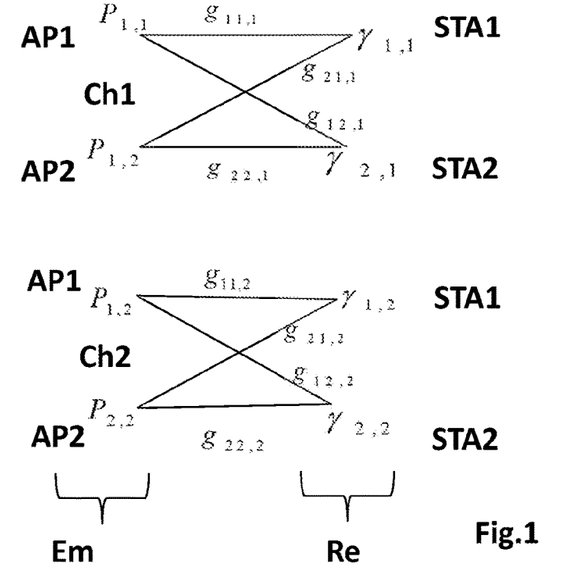
FIG. 1 is a diagrammatic representation of channels between two transmitters and two receivers, the channels being described by direct transmission channel gains $g_{gi,m}$ when j=i and by interfering transmission channel gains $g_{ji,m}$ when j≠i between the transmitter j and the receiver i, i∈{1,2}, j∈{1,2}.

FIG. 1 shows a telecommunications system with two transmitters and two receivers, K=2. The number of channels per link is M=2. The channel coefficient between the transmitter i and the receiver j for the channel m (also known as the channel gain) is written $g_{ij,m}$, and it is greater than or equal to zero. The power allocated by the transmitter i to the channel m is written $P_{i,m}$. The SINR evaluated by the receiver j for the channel m is written $\gamma_{j,m}$. The transmission end is written Em and the reception end is written Re. The expression for the SINR is that corresponding to the signal received by a receiver i of the type without interference cancellation served by the transmitter i and suffering interference from the transmitters j, with j≠i:

$$\gamma_{i,m} = \frac{g_{ii,m} P_{i,m}}{1 + \sum_{j \neq i} g_{ji,m} P_{j,m}}, \quad (1)$$

The algorithm has an initialization stage that corresponds to the subframe index t being equal to zero. During this stage, each transmitter i∈{1, 2, ..., K} allocates the power $P_{i,m}(0)$ to the channel m∈{1, 2, ..., M}. For each transmitter, the M allocated powers form an allocation vector. The allocation vectors may be selected arbitrarily providing each satisfies the constraint of the total power $P_{i,max}$ available at the transmitter i under consideration:

$$\sum_{m=1}^{M} P_{i,m}(0) \le P_{i,max} \quad (2)$$

Thereafter, the algorithm has a stage of iterations on the frame index k (referred to as the outer loop), from k=0 to a stop criterion. At each iteration k, the algorithm has a stage of iterations on the transmitter index i (referred to as the inner loop), from i=1 to K. At each iteration i, the algorithm calculates the subframe index t=kK+i and updates the power vector of the transmitter i:

$$P_{i,m}(t) = \left[\frac{1}{\lambda} - \frac{P_{i,m}(t-1)}{\gamma_{i,m}(t-1)}\right]^+ \quad (3)$$

where $\lambda$ is a parameter to be adjusted so that the sum of the powers $\Sigma_m P_{i,m}$ of the vector is equal to the maximum power $P_{i,max}$ and where $[x]^+ = \max(0,x)$.

By way of example, the stop criterion for the stage of iterations on the frame index k may be determined in such a manner that:

$$\forall i \in \{1,2,\ldots,K\}, \forall m \in \{1,2,\ldots,M\}, |P_{i,m}(t) - P_{i,m}(t-1)| > \in \quad (4)$$

where $\in \ge 0$ is a parameter to be set.

The algorithm takes place as follows. At each iteration i, a single transmitter updates the allocated transmission power vector, and then the transmitters transmit simultaneously and subsequently receive the respective SINRs returned by the receivers.

The IWFA algorithm cannot be used when the set of transmitter configurations is finite. The IWFA cannot be used when the transmitter has a finite number of power allocation/control possibilities, i.e. when the total power level or the per-band power level is discrete. Specifically, just like the so-called "water-filling" solution, the IWFA relies on a differentiation operation (taking a derivative) relative to a continuous quantity, which operation cannot be performed relative to a discrete quantity. Furthermore, the IWFA is a special case of sequential best-response dynamics, known for not converging when the optimization space is discrete. Such a constraint is not compatible with so-called third generation (3G) telecommunications networks nor with subsequent versions thereof as standardized by the 3GPP and known under the acronyms UMTS, LTE, LTE advanced, . . . , which require power levels to be discrete.

The IWFA algorithm converges only for very particular utility functions. Specifically, convergence is guaranteed for the scenario of receivers that are co-located and utility functions of the Shannon transmission data rate type expressed in the manner shown in equation (5). Nevertheless, it can be used for any utility function, but without any guarantee on the performance that will be obtained. Specifically, updating formula (3) enables convergence to be ensured for the following utility functions:

$$u_i = \sum_{m=1}^{M} \log_2(1 + \gamma_{i,m}) \quad (5)$$

only if the SINR corresponds to a multi-band or multi-channel multiple access channel, i.e. to a communications system having K transmitters and only one receiver. When there are K receivers that are not co-located, convergence is ensured for utility functions in compliance with relationship (5) only when interference levels are low.

SUMMARY OF THE INVENTION

An aspect of the present disclosure relates to a method of coordinating a transmitter with K−1 transmitters, the K transmitters being in communication respectively with K receivers via channels that are characterized, for a frequency band m between the transmitter j and the receiver i, by direct transmission channel gains when j=i and by interfering transmission channel gains when j≠i, i∈{1, . . . , K}, j∈{1, . . . , K}, m∈{1, . . . , M}, K>1, each transmitter having available estimates of the direct channel gain and of the interfering channel gains affecting its receiver. The method comprises:

an "exchange" stage during which the K transmitters transmit simultaneously K respective sequences of T2 subframes of T2 respective power levels per band m coding the estimated channel gains and during which the K transmitters receive, after each subframe, SINR estimates based on observations of a received signal as returned by the K receivers to their respective transmitters, T2≥1.

Known techniques exist that enable a transmitter i to know the estimate of the direct channel gain $g_{ii,m}$ and the estimates of the gains $g_{ji,m}$ of the channels interfering with its receiver i, j≠i. During the exchange stage, the transmitters exchange their estimated channel gains by encoding them using power level coding. The coefficients $g_{ii,m}$, $g_{ij,m}$ may equally well model the attenuation coefficients associated with propagation (path loss) or the attenuation coefficients associated with slow fading (shadowing) or with fast fading.

A transmitter thus transmits in succession T2 subframes in which the associated power levels code the channel gain estimates known to the transmitter. The receiver returns an estimated signal to interference plus noise ratio (SINR) to its transmitter at the end of a subframe. The estimate is made on the basis of observations of the received signal while the K transmitters are simultaneously transmitting respective subframes. The estimated SINR as returned may equally well be expressed in the form of an estimate of the available power and of an estimate of the interfering power including noise, or in the form of an estimate of the ratio of these powers, or in any other form that makes it possible to deduce the SINR.

The estimate is generally noisy, in particular given that the information returned by the return channel is quantized. The returned estimate may be the result of averaging. Example, in a band m that comprises a plurality of narrowband sub carriers, averaging may consist in making the estimate over all of the sub carriers or over a subset of them. At the end of the succession of T2 subframes, a transmitter thus has T2 estimates of a signal to noise plus interference ratio as evaluated by its receiver. After the last subframe, the transmitter i has a system of T2 equations in T2×(K−1) unknowns, which are the powers transmitted by the K−1 transmitters and received by its receiver. For the transmitter i, the power levels transmitted by the other transmitters may be estimated by selecting the sequence that is the most likely in the maximum likelihood sense. Knowing the powers transmitted by the other transmitters, the transmitter can determine the corresponding channel gains by decoding the power levels of the transmitted powers. Finally, at the end of the exchange stage, each transmitter knows all of the channel gains. Thus, each transmitter can determine its own transmission power in compliance with a criterion for minimizing global interference for the set of K transmitters. Thus, the method of the invention converges on a power allocation with efficiency that is global, i.e. that is evaluated at system level, as contrasted with the IWFA algorithm that converges on a power allocation with efficiency that is local, i.e. that is evaluated at transmitter level. Unlike the IWFA algorithm, the method of the invention does not rely on an iterative process, thus making it possible to avoid the convergence problem of the IWFA algorithm. Also, the invention is compatible with all kinds of utility function that may be selected solely on the basis of power control policies and of the channel gains of the communications system under consideration.

In an embodiment, channel gains are estimated during an acquisition stage of acquiring transmission channel gains on a frequency band m between the transmitter j and the receiver i, during which the K transmitters transmit simultaneously respective sequences of T1 subframes of T1 respective determined power levels and during which the K transmitters receive, after each subframe, estimates of respective SINRs returned by the K receivers to their respective transmitters.

In this implementation, the method includes a particular acquisition stage. In this acquisition stage, the transmitters contributing to coordination transmit a succession of T1 power levels that are the equivalent of a training sequence. These training sequences are known to the transmitters, i.e. a transmitter knows the power levels transmitted in succession during the T1 subframes by each of the K−1 transmitters. A transmitter estimates the received signal to interference plus noise ratio (SINR) T1 times. At the end of a subframe, the receiver returns, the estimated value of the SINR to its transmitter. At the end of the training sequence, a transmitter thus has T1 estimates of a signal to noise plus interference ratio as estimated by its receiver. The SINR may be expressed in the following general form:

$$\gamma_{i,m} = f(\{P_{i,m}\}_{i=1}^K, \{g_{ji,m}\}_{j=1}^K) \text{ or}$$

$$\gamma_{i,m} = f(\{P_{i,m}\}_{i=1}^K, E\{g_{ji,m}\}_{j=1}^K) \text{ or}$$

$$\text{in the form: } \gamma_{i,m} = \frac{g_{ii,m}P_{i,m}}{1+\sum_{j\neq i} g_{ji,m}P_{j,m}}.$$

Since the expression for the SINR depends on the direct channel between the transmitter i and its receiver i, on the channels interfering with the receiver i, and on the transmission powers of the K transmitters, the transmitter i has a system of T1 equations with K unknowns constituted by the channel gains $g_{ji,m}$ for $j\in\{1,\ldots,K\}$. The transmitter can thus obtain an estimate of the K channel gains $\hat{g}_{ji,m}$ by solving the system of equations. If the transmitted power matrix is invertible, it is easy to solve the system of equations by inverting this matrix.

In an implementation, the number T1 of subframes is equal to K.

This particular choice makes it possible to minimize the number of subframes that are transmitted and the amount of calculation.

In an implementation, the number T1 of subframes is equal to K−X, where X is the number of channel gains known to a transmitter.

In an embodiment, the signal to interference plus noise ratios returned by the receivers are normalized.

This implementation has the advantage of simplifying the method by avoiding taking into consideration the noise that is observed by the receivers while estimating channel gains and during the exchange stage. In this implementation, the signal to interference plus noise ratio may be expressed in the following form:

$$\gamma_i^m = \frac{g_{ii}^m P_{i,m}}{1+\sum_{j\neq i} g_{ji}^m P_j^m} \text{ with } g_{ij}^m = \frac{h_{ij}^m}{\sigma_i^2}.$$

This implementation advantageously reduces the cost of signalling, since it makes it possible to avoid returning the noise variances $\sigma_i^2$ to the transmitters.

In an implementation, the power levels of the sequence of T1 subframes from a transmitter are determined under the constraint that the matrix $S_{i,m}$ is pseudo-invertible in the Moore Penrose sense with a probability close to one, the matrix $S_{i,m}$ being:

$$S_{i,m} = \begin{pmatrix} -\hat{\gamma}_{i,m}(1)P_{1,m}(1) & -\hat{\gamma}_{i,m}(1)P_{2,m}(1) & \ldots & P_{i,m}(1) & \ldots & -\hat{\gamma}_{i,m}(1)P_{K,m}(1) \\ -\hat{\gamma}_{i,m}(2)P_{1,m}(2) & -\hat{\gamma}_{i,m}(2)P_{2,m}(2) & \ldots & P_{i,m}(2) & \ldots & -\hat{\gamma}_{i,m}(2)P_{K,m}(2) \\ \vdots & \vdots & & \vdots & & \vdots \\ -\hat{\gamma}_{i,m}(T1)P_{1,m}(T1) & -\hat{\gamma}_{i,m}(T1)P_{2,m}(T1) & \ldots & P_{i,m}(T1) & \ldots & -\hat{\gamma}_{i,m}(T1)P_{K,m}(T1) \end{pmatrix}$$

with $\hat{\gamma}_{i,m}(t)$ being the estimate of the signal to noise plus interference ratio returned by the receiver i to the transmitter i, $P_{i,m}(t)$ being the determined power levels of the sequence of T1 subframes, and $t\in\{1, 2, \ldots, T1\}$.

This way of determining the power levels is advantageous in that the matrix $S_{i,m}$ is pseudo-invertible, and thus the system of equations in K unknowns is easy to solve. The K channel gains can be estimated using the following relationship:

$$\begin{pmatrix} \hat{g}_{1i,m} \\ \vdots \\ \hat{g}_{Ki,m} \end{pmatrix} = (\overline{S_{i,m}}S_{i,m})^{-1}\overline{S_{i,m}} \times \begin{pmatrix} \hat{\gamma}_{i,m}(1) \\ \vdots \\ \hat{\gamma}_{i,m}(T1) \end{pmatrix}$$

In an implementation, the power levels of the sequence of T1 subframes of a transmitter are determined using a random draw until the matrix $\Omega_{i,m}$ is a full rank matrix:

$$\Omega_{i,m} = \begin{pmatrix} P_{1,m}(1) & P_{2,m}(1) & \ldots & P_{i,m}(1) & \ldots & P_{K,m}(1) \\ P_{1,m}(2) & P_{2,m}(2) & \ldots & P_{i,m}(2) & \ldots & P_{K,m}(2) \\ \vdots & \vdots & & \vdots & & \vdots \\ P_{1,m}(T1) & P_{2,m}(T1) & \ldots & P_{i,m}(T1) & \ldots & P_{K,m}(T1) \end{pmatrix}$$

where are the determined power levels of the sequence of T1 subframes, and t∈{1, 2, . . . , T1}.

This implementation makes it simple to determine the power levels of the sequences of T1 subframes from each transmitter.

In an implementation, the power level coding is joint source-channel coding of the space-time type, in which the space dimension corresponds to the number M of channels m, and the time dimension corresponds to the number T2 of subframes.

This implementation makes it possible to benefit from optimum coding.

In an implementation, the power level coding is separate source-channel coding.

This implementation makes it possible to benefit from coding that is less complex than joint source-channel coding.

In an implementation, the signal to interference plus noise ratios are estimated before filtering, the filtering being associated with detecting the received signal.

An alternative to this implementation consists in the receiver estimating the SINR after the filtering associated with detecting the received signal. Estimating before filtering has the advantage of being independent of the characteristics of the filter, which characteristics may depend on the interfering powers.

The invention also provides a transmitter for performing a method of coordinating with K−1 transmitters, the K transmitters being in communication respectively with K receivers via channels that are characterized, for a frequency band m between the transmitter j and the receiver i, by direct transmission channel gains j=i and by interfering transmission channel gains when j≠i, the transmitter having available estimates of the direct channel gain and of the interfering channel gains affecting its receiver. The transmitter comprises:
- a processor unit for coding the estimated channel gains as a sequence of T2 subframes of T2 respective power levels per band m;
- a transmitter module for transmitting the sequence; and
- a reception module for receiving estimated values of an SINR returned by the receiver after each subframe.

The invention also provides a telecommunications system comprising K transmitters as specified above.

In a preferred embodiment, the steps of the coordination method of the invention are determined by the instructions of a program incorporated in an electronic circuit such as a chip, which may itself be arranged in an electronic device such as a communications entity (base station, access point, etc.). The coordination method of the invention may equally well be performed when the program is loaded into a calculation member such as a processor or the equivalent with its operation then being controlled by executing the program.

Consequently, the invention also applies to a computer program, in particular a computer program on or in a data medium, and suitable for performing the invention. The program may use any programming language, and it may be in the form of source code, object code, or code intermediate between source code and object code, such as in a partially compiled form, or in any other desirable form for implementing a method of the invention.

The data medium may be any device capable of storing the program. For example, the medium may comprise storage means such as a read only memory (ROM), for example a compact disk (CD) ROM or a microelectronic circuit ROM, or indeed magnetic recording means, e.g. a hard disk.

Alternatively, the data medium may be an integrated circuit in which the program is incorporated, the circuit being adapted to execute or to be used in the execution of the method in question.

Furthermore, the program may be converted into a transmissible form such as an electrical or optical signal that can be conveyed via an electrical or optical cable, by radio, or by other means. The program of the invention may in particular be downloaded from a network of the Internet type.

LIST OF FIGURES

Other characteristics and advantages of the invention appear from the following description of particular implementations made with reference to the accompanying figures that are given as nonlimiting examples.

DETAILED DESCRIPTION OF AN EMBODIMENT

The channel gains/coefficients are assumed either to be constant or else to be piecewise constant. Under such circumstances, the channel gains are thus steady over a duration referred to as the coherence time Tc. In a preferred implementation, the method of the invention operates over a duration T shorter than or equal to the coherence duration, T≤Tc, as does the prior art IWFA algorithm.

When taking fast fading into account, the channels corresponding to a subband m are assumed to be steady over the duration T with T≤Tc, thus making it possible to omit the time index (or the orthogonal frequency division multiplexing (OFDM) symbol when using multi-carrier transmission) for the coefficients of the channel. The number of consecutive carriers defining the coherence band is written C. The signals or the observations corresponding to a subframe of duration $T_0 \leq T \leq T_c$ ($T_0$ OFDM symbols with multi-carrier transmission) as received by, or available to, the receiver i having $N_R$ antennas for the subband m with N narrowband carriers, may be written $y_{i,m}^{(n)}(k) \in \mathbb{C}^{N_R}$, n being the index for numbering carriers within the subband m, and k being the index of the OFDM symbol (the observations/samples that are useful for estimating the SINR are linked to all of the indices n, k that are available in time and in frequency for a receiver i and a subband m). These signals or observations may then be expressed in the following form:

$$y_{i,m}^{(n)}(k) = h_{ii,m}^{(n)} s_{i,m}^{(n)}(k) + \sum_{j \neq i} h_{ji,m}^{(n)} s_{j,m}^{(n)}(k) + w_{i,m}^{(n)}(k) \tag{6}$$

$$\forall n = 0, \ldots, N-1$$

$$\forall k = 0, \ldots, T_0 - 1$$

where $h_{ji,m}^{(n)} \in \mathbb{C}^{N_R}$ is the scalar input and vector output channel between the transmitter j and the receiver i for the subband m, where $w_{i,m}^{(n)}(k)$ is an additive Gaussian white noise sample of variance $\sigma_i^2$, and where $P_{i,m}$ is the transmitted power associated with the transmitted signal $s_{i,m}^{(n)}(k)$, which power is assumed to be constant for all of the carriers of the subband m, $\forall i=1, \ldots, K$. Without loss of generality, it is assumed that N is divisible by C, i.e., Q=N/C. It follows that the subband m can be divided into Q blocks in which the channel coefficients are approximately constant (Q-block fading). For n=Cq+c, integer division of n by C giving a dividend q and a remainder c, with c varying over the range 0 to C-1 by definition, the expression (6) can be written in the following form:

$$y_{i,m}^{(Cq+c)}(k) = h_{ii,m}^{(q)} s_{i,m}^{(Cq+c)}(k) + \sum_{j \neq i} h_{ji,m}^{(q)} s_{j,m}^{(Cq+c)}(k) + w_{i,m}^{(Cq+c)}(k) \quad (7)$$

$q = 0, \ldots, Q-1$ and $c = 0, \ldots, C-1$ where $$h_{ji,m}^{(q)} = \frac{1}{C} \sum_{c=0}^{C-1} h_{ji,m}^{(Cq+c)} \text{ with } q = 0, \ldots, Q-1$$

The SINR associated with the subband m for the receiver i is estimated on the basis of the available observations $y_{i,m}^{(n)}(k)$ over an observation duration $T_O$ of a subframe ($T_O < T_c$) and on the available knowledge of the incident channels and the powers of the other transmitters. When the SINR is estimated, the following notation $\hat{\gamma}_m$ is used for the receiver i and the band m. By definition, the estimate suffers from estimation noise $\xi_{i,m}$, so:

$$\hat{\gamma}_{i,m} = \gamma_{i,m} + \xi_{i,m}$$

where $\gamma_{i,m}$ is the theoretical value of the SINR calculated on the basis of perfect knowledge (no noise) of all of the incident channels and all of the transmitter powers. It should be observed that the longer the observation duration $T_O$, the greater the number of available observations $y_{i,m}^{(n)}(k)$ and thus the lower the level of the estimation noise $\xi_{i,m}$. This is an important practical aspect of the method of setting the duration of a subframe (in addition to considerations involving steadiness over time).

The SINR returned by the receiver may be taken into account either before or after filtering.

After filtering, the SINR takes account of the reception filter associated with the received signal detector. Under such circumstances, consideration is given to a linear filter $f_{ii,m}^{(q)} \in \mathbb{C}^{N_R}$ applied on reception to the samples n=Cq+c with c varying over the range 0 to C-1. The subband m may be defined by the Q theoretical SINRs, with † being the conjugate transpose operator:

$$\gamma_{i,m}^{(q)} = \frac{|(f_{ii,m}^{(q)})^\dagger h_{ii,m}^{(q)}|^2 P_{i,m}}{\sigma_i^2 (f_{ii,m}^{(q)})^\dagger f_{ii,m}^{(q)} + \sum_{j \neq i} |(f_{ii,m}^{(q)})^\dagger h_{ji,m}^{(q)}|^2 P_{j,m}}$$

The subband m may be defined by the sole equivalent theoretical SINR:

$$\gamma_{i,m} = \frac{P_{i,m} \frac{1}{Q} \sum_{q=0}^{Q-1} |(f_{ii,m}^{(q)})^\dagger h_{ii,m}^{(q)}|^2}{\frac{\sigma_i^2}{Q} \sum_{q=0}^{Q-1} (f_{ii,m}^{(q)})^\dagger f_{ii,m}^{(q)} + \sum_{j \neq i} P_{j,m} \frac{1}{Q} \sum_{q=0}^{Q-1} |(f_{ii,m}^{(q)})^\dagger h_{ji,m}^{(q)}|^2} \quad (8)$$

$$= \frac{\dfrac{\sum_{q=0}^{Q-1} |(f_{ii,m}^{(q)})^\dagger h_{ii,m}^{(q)}|^2}{\sigma_i^2 \sum_{q=0}^{Q-1} (f_{ii,m}^{(q)})^\dagger f_{ii,m}^{(q)}}}{1 + \sum_{j \neq i} P_{j,m} \dfrac{\sum_{q=0}^{Q-1} |(f_{ii,m}^{(q)})^\dagger h_{ji,m}^{(q)}|^2}{\sigma_i^2 \sum_{q=0}^{Q-1} (f_{ii,m}^{(q)})^\dagger f_{ii,m}^{(q)}}} P_{i,m}$$

$$= \frac{g_{ii,m} P_{i,m}}{1 + \sum_{j \neq i} g_{ji,m} P_{j,m}}$$

where: $g_{ii,m} = \dfrac{\sum_{q=0}^{Q-1} |(f_{ii,m}^{(q)})^\dagger h_{ii,m}^{(q)}|^2}{\sigma_i^2 \sum_{q=0}^{Q-1} (f_{ii,m}^{(q)})^\dagger f_{ii,m}^{(q)}} \in \mathbb{R}^+$ and $\forall j \neq i$ $$g_{ji,m} = \frac{\sum_{q=0}^{Q-1} |(f_{ii,m}^{(q)})^\dagger h_{ji,m}^{(q)}|^2}{\sigma_i^2 \sum_{q=0}^{Q-1} (f_{ii,m}^{(q)})^\dagger f_{ii,m}^{(q)}} \in \mathbb{R}^+$$

are defined as the equivalent channels (belonging to the set of reals $\mathbb{R}^+$) between the transmitter j and the receiver i for the band m.

When $N_R=1$ and $Q=1$, then by writing $f_{ii,m}^{(0)} = h_{ji,m}^{(0)\dagger}$ (matched filter), it follows that:

$$g_{ii,m} = \frac{|h_{ii,m}^{(0)}|^2}{\sigma_i^2} \in \mathbb{R}^+ \text{ and } \forall j \neq i$$

$$g_{ji,m} = \frac{|h_{ji,m}^{(0)}|^2}{\sigma_i^2} \in \mathbb{R}^+$$

The equivalent SINR estimated at the receiver i for the subband m may be estimated in a preferred implementation as follows.

The samples $z_{i,m}^{(n)}(k)$ after filtering are expressed by the following relationship:

$$z_{i,m}^{(n)}(k) = f_{ii,m}^{(q)\dagger} h_{ii,m}^{(q)} s_{i,m}^{(n)}(k) + \sum_{j \neq i} f_{ii,m}^{(q)\dagger} h_{ji,m}^{(q)} s_{j,m}^{(n)}(k) + f_{ii,m}^{(q)\dagger} w_{i,m}^{(n)}(k)$$

with $n = Cq + c$

An estimate of the equivalent SINR based on the knowledge of the samples $z_{i,m}^{(n)}(k)$ (after filtering) and of the transmitted symbols $s_{i,m}^{(Cq+c)}(k)$ (pilot symbols) over the observation duration $T_O$, and also of the estimated channel $\hat{h}_{ii,m}^{(Cq+c)}$ (calculated from the pilot symbols) is expressed in the following form:

$$\hat{\gamma}_{i,m} = \frac{\frac{1}{T_0 CQ} \sum_{k,c,q} \hat{h}_{ii,m}^{(q)\dagger} f_{ii,m}^{(q)} z_{i,m}^{(Cq+c)}(k) s_{i,m}^{(Cq+c)\dagger}(k)}{\frac{1}{T_0 CQ} \sum_{k,c,q} \left( z_{i,m}^{(Cq+c)}(k) - f_{ii,m}^{(q)\dagger} \hat{h}_{ii,m}^{(Cq+c)} s_{i,m}^{(Cq+c)}(k) \right)^\dagger} \quad (9)$$

$$\left( z_{i,m}^{(Cq+c)}(k) - f_{ii,m}^{(q)\dagger} \hat{h}_{ii,m}^{(Cq+c)} s_{i,m}^{(Cq+c)}(k) \right)$$

$$\simeq \frac{P_{i,m} \frac{1}{Q} \sum_{q=0}^{Q-1} |(f_{ii,m}^{(q)})^\dagger h_{ii,m}^{(q)}|^2}{\frac{\sigma_i^2}{Q} \sum_{q=0}^{Q-1} (f_{ii,m}^{(q)})^\dagger f_{ii,m}^{(q)} + \sum_{j \neq i} P_{j,m} \frac{1}{Q} \sum_{q=0}^{Q-1} |(f_{ii,m}^{(q)})^\dagger h_{ji,m}^{(q)}|^2}$$

For estimation before filtering, the equivalent SINR may be estimated from the samples before filtering $y_{i,m}^{(n)}(k)$ over the duration $T_0$ in the following manner, assuming that the transmitted symbols $s_{i,m}^{(Cq+c)}(k)$ and the estimated channel $\hat{h}_{ii,m}^{(Cq+c)}$ are known:

$$\hat{\gamma}_{i,m} = \frac{\frac{1}{T_0 CQ} \sum_{k,c,q} \hat{h}_{ii,m}^{(q)\dagger} y_{i,m}^{(Cq+c)}(k) s_{i,m}^{(Cq+c)\dagger}(k)}{\frac{1}{T_0 CQ} \sum_{k,c,q} \left( y_{i,m}^{(Cq+c)}(k) - \hat{h}_{ii,m}^{(Cq+c)} s_{i,m}^{(n)}(k) \right)^\dagger} \quad (10)$$

$$\left( y_{i,m}^{(Cq+c)}(k) - \hat{h}_{ii,m}^{(Cq+c)} s_{i,m}^{(n)}(k) \right)$$

$$\simeq \frac{P_{i,m} \frac{1}{Q} \sum_{q=0}^{Q-1} (h_{ii,m}^{(q)})^\dagger h_{ii,m}^{(q)}}{\sigma_i^2 + \sum_{j \neq i} P_{j,m} \frac{1}{Q} \sum_{q=0}^{Q-1} (h_{ii,m}^{(q)})^\dagger h_{ji,m}^{(q)}}$$

Let the associated theoretical SINR be:

$$\gamma_{i,m} = \frac{P_{i,m} \frac{1}{Q} \sum_{q=0}^{Q-1} (h_{ii,m}^{(q)})^\dagger h_{ii,m}^{(q)}}{\sigma_i^2 + \sum_{j \neq i} P_{j,m} \frac{1}{Q} \sum_{q=0}^{Q-1} (h_{ii,m}^{(q)})^\dagger h_{ji,m}^{(q)}}$$

$$= \frac{g_{ii,m} P_{i,m}}{1 + \sum_{j \neq i} g_{ji,m} P_{j,m}}$$

where:

$$g_{ii,m} = \frac{\frac{1}{Q} \sum_{q=0}^{Q-1} (h_{ii,m}^{(q)})^\dagger h_{ii,m}^{(q)}}{\sigma_i^2} \in \mathbb{R}^+ \text{ and } \forall j \neq i$$

$$g_{ji,m} = \frac{\frac{1}{Q} \sum_{q=0}^{Q-1} (h_{ii,m}^{(q)})^\dagger h_{ji,m}^{(q)}}{\sigma_i^2} \in \mathbb{R}^+$$

are defined as the equivalent channels (belonging to the set of reals $\mathbb{R}^+$) between the transmitter j and the receiver i for the band m. When $N_R=1$ and $Q=1$, it follows that:

$$g_{ii,m} = \frac{|h_{ii,m}^{(0)}|^2}{\sigma_i^2} \in \mathbb{R}^+ \text{ and } \forall j \neq i$$

$$g_{ji,m} = \frac{|h_{ji,m}^{(0)}|^2}{\sigma_i^2} \in \mathbb{R}^+$$

Coordination over a very long duration, greater than the coherence duration Tc of the channel, makes it possible to take account of slow fading (shadowing). The coefficients $g_{ji,m}$ can then be averaged (or filtered over time) in order to have access to a scale of slower fluctuations of the "shadowing". The equivalent SINR can be written formally:

$$\gamma_{i,m} = \frac{E\{g_{ii,m}\} P_{i,m}}{1 + \sum_{j \neq i} E\{g_{ji,m}\} P_{j,m}} \quad (11)$$

where $E\{g_{ji,m}\}$ is the stochastic mean (or time mean by ergodicity) of the coefficients $g_{ji,m}$ over the fast fading distribution.

Finally, the expression for the equivalent SINR may be in the form of a function $f$ of equivalent channels ($g_{ji,m}$ or $E\{g_{ji,m}\}$) of the transmitter j to the receiver i for the subband m and the transmission powers of the K transmitters $P_{i,m}$:

$$\gamma_{i,m} = f(\{P_{i,m}\}_{i=1}^K, \{g_{ji,m}\}_{j=1}^K) \text{ or } \gamma_{i,m} = f(\{P_{i,m}\}_{i=1}^K, E\{g_{ji,m}\}_{j=1}^K) \quad (12)$$

in which expression $g_{ji,m}$ is assumed to be a non-negative real (or quantized on a sufficient number of bits) and in which the power $P_{i,m}$ transmitted over the channel m by the access point i belongs to a discrete space.

The invention is described in detail by giving consideration by way of illustration to a wireless communications system of the Wi-Fi type having K access points and K stations communicating respectively with the access points, K>1.

According to the IEEE 802.11n standard, each access point transmits over a channel that occupies a band B about a carrier frequency, e.g. B=20 MHz occupied by 52 OFDM sub carriers. According to the IEEE 802.11n standard, in certain configurations, 13 Wi-Fi carrier frequencies are distinguished that define 13 channels that are spaced apart by 5 MHz. The number of channels that can thus be selected is therefore small. In that configuration, there is therefore a high probability of selecting the same Wi-Fi channel or neighbouring channels for different access points, thus leading to interference between channels used by access points that are geographical neighbours. Two access points are neighbours if a station from among the K stations can detect both access points.

For example, assuming that the Wi-Fi channel has already been selected by the access points, the M channels taken into account by the method are then those that correspond to the OFDM sub carriers. The method of the invention thus proposes determining a power allocation for the M=52 sub carriers for the K access points of the telecommunications system that transmit on the same Wi-Fi channel to K respective Wi-Fi stations. For each channel m among the M channels associated with the M=52 sub carriers, the quality of the communications channel between the access point $i \in \{1, 2, \ldots, K\}$ and the station $j \in \{1, 2, \ldots, K\}$ is represented by the coefficient $g_{ij,m} \geq 0$. Under such circumstances, N=1 (carrier) in equation (6).

In another example, the method seeks to participate in Wi-Fi channel selection by the access points. The M channels taken into account by the method are then those corresponding to the Wi-Fi carrier frequencies, which define 13 channels that are spaced apart by 5 MHz. Under such circumstances, N=52 carriers in equation (6). The method of the invention thus proposes determining a power allocation for the M=13 channels for the K access points of the telecommunications system that transmit on one of the 13 Wi-Fi channels to K respective Wi-Fi stations. For each channel m among the M=13 channels, the quality of the communications channel between the access point $i \in \{1, 2, \ldots, K\}$ and the station $j \in \{1, 2, \ldots, K\}$ is represented by the coefficient $g_{ij,m} \geq 0$.

The SINR is assumed to have a structure of the type corresponding to the structure of a receiver without interference canceling, and its general expression (12) can be given by any one of relationships (8)-(11). Nevertheless, the method can equally well be used with interference canceling receivers. Under such circumstances, only the expression for the SINR is changed in order to take account of the canceled interference; it is only the number of interfering signals that changes in the denominator of the SINR.

The system may be represented diagrammatically by FIG. 1 when K=2 and M=2. The two transmitters are those of two access points AP1 and AP2. The two receivers are those of two stations STA1 and STA2. The two channels or bands under consideration are written Ch1 and Ch2.

For any K, each transmitter APi has an estimate of the direct channel gain and of the gains of the channels interfering with its receiver STAi, i.e. the $\hat{g}_{ji,m}$ for all $j \in \{1, \ldots, K\}$ and for all $m \in \{1, 2, \ldots, M\}$. The estimated gain of channel $g_{ji,m}$ is written $\hat{g}_{ji,m}$. Knowledge about the channel gains may be acquired in various implementations.

In a first implementation of the method, the transmitter i acquires knowledge about the channel gains for all $j \in \{1, \ldots, K\}$ and for all $m \in \{1, 2, \ldots, M\}$ using known methods of estimating channel gains.

In a second implementation of the method, the transmitter i is assumed to have no knowledge about a certain number L of channels that are incident on its receiver i, where the number L is less than or equal to K.

Figure 2:
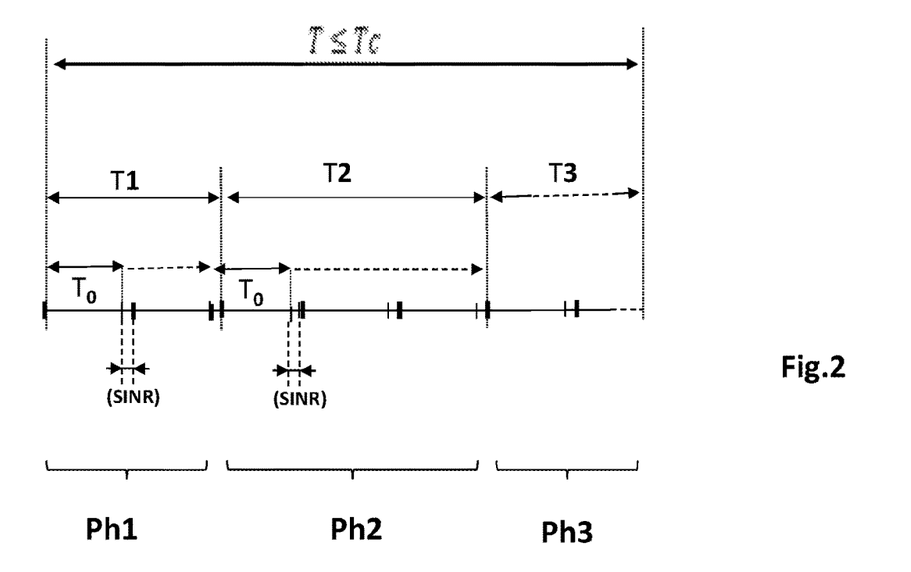
FIG. 2 is a diagram of three stages of a method of the invention in a particular implementation.

Acquisition then takes place during a stage Ph1 that runs in time as shown in FIG. 2. During this stage Ph1, the K transmitters respectively transmit K sequences simultaneously. A sequence is a succession of T1 subframes (of duration $T_0$) respectively of T1 determined power levels, the dimension of the vector being equal to the number M of bands. These sequences are comparable with training sequences, they are known to the transmitters. After a subframe has been transmitted, each transmitter i receives over the band m the optionally normalized SINR as returned by its receiver i. This "acquisition" stage Ph1 thus enables the transmitter i to obtain T1 estimates of the SINR as evaluated by its receiver for a given band m.

Since T1 is strictly greater than 1, a transmitter i receives at least two SINR estimates returned by its receiver for a given band m. The subframe index t varies from 1 to T1, $t \in \{1, 2, \ldots, T1\}$. The successive determined powers of a transmitted sequence are written: $P_{i,m}(t)$ $t \in \{1, 2, \ldots, T1\}$. The SINRs as estimated and returned on each subframe t by the station i are written: $\hat{\gamma}_{i,m}(t)$. Assuming that the SINR is normalized, the transmitter i then solves the system of T1 equations per band m:

$$\begin{cases} P_{i,m}(1)\hat{g}_{ii,m} - \sum_{j \neq i} P_{j,m}(1)\hat{\gamma}_{i,m}(1)\hat{g}_{ji,m} = \hat{\gamma}_{i,m}(1) \\ \vdots \qquad \qquad \vdots \qquad \qquad \vdots \\ P_{i,m}(T1)\hat{g}_{ii,m} - \sum_{j \neq i} P_{j,m}(T1)\hat{\gamma}_{i,m}(T1)\hat{g}_{ji,m} = \hat{\gamma}_{i,m}(T1) \end{cases} \quad (14)$$

in L unknowns that are the channel gains $\hat{g}_{ji,m}$ for $j \in \{1, \ldots, L\}$ in order to obtain an estimate of these L channel gains $\hat{g}_{ji,m}$.

Selecting a number T1 such that T1≥K ensures that the system can be solved using equation (17). An arbitrary T1 may be selected in order to solve (14), e.g. if it is possible to use a coarser estimate or if a priori information is available. For example, in TDD, the coefficient $g_{ii,m}$ may be available at the transmitter thereby eliminating an unknown, and under such circumstances, it is possible to select T1=K−1. More generally, if the transmitter i knows X coefficients, then it is possible to select T1=K−X. Also, if the limited power matrix can be inverted, it is easy to solve the system of equations by inverting this matrix.

This "acquisition" stage Ph1 makes it possible to obtain an estimate of at most K transmission channel gains over a frequency band m between the access point j and the station i when T1≥K.

In an embodiment, the power levels of the training sequence of a transmitter are determined under the constraint that the following matrix $S_{i,m}$ is pseudo-invertible in the Moore Penrose sense, for a channel m, with a probability close to one:

$$S_{i,m} = \begin{pmatrix} -\hat{\gamma}_{i,m}(1)P_{1,m}(1) & -\hat{\gamma}_{i,m}(1)P_{2,m}(1) & \ldots & P_{i,m}(1) & \ldots & -\hat{\gamma}_{i,m}(1)P_{K,m}(1) \\ -\hat{\gamma}_{i,m}(2)P_{1,m}(2) & -\hat{\gamma}_{i,m}(2)P_{2,m}(2) & \ldots & P_{i,m}(2) & \ldots & -\hat{\gamma}_{i,m}(2)P_{K,m}(2) \\ \vdots & \vdots & & \vdots & & \vdots \\ -\hat{\gamma}_{i,m}(T1)P_{1,m}(T1) & -\hat{\gamma}_{i,m}(T1)P_{2,m}(T1) & \ldots & P_{i,m}(T1) & \ldots & -\hat{\gamma}_{i,m}(T1)P_{K,m}(T1) \end{pmatrix} \quad (15)$$

In an implementation, the determined power levels $P_{i,m}(t)$, $t \in \{1, 2, \ldots, T1\}$ of the training sequences of the transmitter i form a full rank matrix $\Omega_{i,m}$:

$$\Omega_{i,m} = \begin{pmatrix} P_{1,m}(1) & P_{2,m}(1) & \ldots & P_{i,m}(1) & \ldots & P_{K,m}(1) \\ P_{1,m}(2) & P_{2,m}(2) & \ldots & P_{i,m}(2) & \ldots & P_{K,m}(2) \\ \vdots & \vdots & & \vdots & & \vdots \\ P_{1,m}(T1) & P_{2,m}(T1) & \ldots & P_{i,m}(T1) & \ldots & P_{K,m}(T1) \end{pmatrix} \quad (16)$$

This determination may consist in randomly drawing each of the power sequences until the matrix $\Omega_{i,m}$ is a full rank matrix.

The channel gains can then be estimated using the following relationship:

$$\begin{pmatrix} \hat{g}_{1i,m} \\ \vdots \\ \hat{g}_{Ki,m} \end{pmatrix} = (\overline{S_{i,m}} S_{i,m})^{-1} \overline{S_{i,m}} \times \begin{pmatrix} \hat{\gamma}_{i,m}(1) \\ \vdots \\ \hat{\gamma}_{i,m}(T1) \end{pmatrix} \quad (17)$$

where $\overline{S_{i,m}}$ designates the matrix that is the transpose of $S_{i,m}$. When the level of noise in the SINRs tends toward zero, or when T1 becomes large, then the estimated gains $\hat{g}_{ji,m}$ tend towards their true values $g_{ji,m}$.

The method includes an "exchange" stage Ph2 comprising a coding step, an estimation step, and a decoding step. During the exchange stage Ph2, the K transmitters respectively transmit sequences of T2 subframes. A sequence is a succession of T2 subframes (of duration $T_0$) of T2 respective power vectors coding the estimated gains $\hat{g}_{ji,m}$. The successive coded power vectors of a transmitted sequence are written: $\underline{P}_i(t)$ $\underline{P}_i(t) = (P_{i,1}(t), \ldots, P_{i,M}(t))$. The subframe index t varies from 1 to T2, $t \in \{1, 2, \ldots, T2\}$, $T2 \geq 1$.

For the transmitter i, the power level coding consists, in its general formulation, in coding the knowledge of the transmitter in terms of channel state into a sequence of power level vectors:

$$\phi_i : \begin{vmatrix} S_i & \to \mathcal{P}^{MT2} \\ \underline{s}_i & \mapsto (\underline{P}_i(T1+1), \ldots, \underline{P}_i(T1+T2)) \end{vmatrix} \quad (18)$$

where $\underline{s}_i \in S_i$ represents the knowledge that the transmitter has about the state super vector of the global channel $[\underline{g}_{11}, \underline{g}_{12}, \ldots, \underline{g}_{KK}]$ with $\underline{g}_{ij} = (g_{ij,1}, \ldots, g_{ij,M})$, and where $\mathcal{P}$ represents the alphabet to which the power levels belong.

In general manner, the coding $\phi_i$ is joint spatial-temporal and source-channel coding. The spatial dimension is given by M i.e. the number of channels, whereas the time dimension is given by the number T2 of subframes during which the transmitters exchange their individual knowledge.

The coding $\phi_i$ may also be separate source-channel coding, per subband m, i.e. $\phi_{i,m} = \phi_{i,m}^C \circ \phi_{i,m}^S$ per subband m. Under such circumstances, the source coding function $\phi_{i,m}^S$ is selected as a vector quantizing operation operating on the vector $(g_{1i,m}, \ldots, g_{Ki,m}) \in \mathbb{R}_+^K$ that enables the transmitter i to make its knowledge about the channels that are incident to the receiver i correspond to a vector quantization cell index k (where L is the number of cells):

$$\phi_{i,m}^S : \begin{vmatrix} \mathbb{R}_+^K & \to \{1, \ldots, L\} \\ (g_{1i,m}, \ldots, g_{Ki,m}) & \mapsto k \end{vmatrix} \quad (19)$$

The quantization cells are selected by using the Lloyd-Max algorithm [3]. $\phi_{i,m}^C$ is the channel coding operation that makes a sequence of powers correspond to a vector quantization cell index:

$$\phi_{i,m}^C : \begin{vmatrix} \{1, \ldots, L\} & \to \mathcal{P}^{T2} \\ k & \mapsto (P_{i,m}(T1+1), \ldots, P_{i,m}(T1+T2)) \end{vmatrix} \quad (20)$$

Let p be the cardinal number of $\mathcal{P}$, then the number of possible power sequences is $p^{T2}=2^n$. Channel coding consists in selecting a subset C, of cardinal number $2^k$, of these sequences, thereby defining a coding rate $$r = \frac{k}{n}.$$

The number of quantization cells L gives the distortion due to the quantization.

In an implementation, the distortion is reduced by selecting a maximum number of cells, i.e. $L = p^{T2} = 2^n$. Channel coding $\phi_{i,m}^C$ consists merely in making each cell index corresponded to a power sequence. This gives a channel coding rate of 1. The representative of each quantization cell is selected as follows. The cells are indexed from 1 to $p^{T2}$, where p is the cardinal number of $\mathcal{P}$. For each cell, it is possible to calculate the probability that the gain vector $(g_{1i,m}, \ldots, g_{Ki,m}) \in \mathbb{R}_+^K$ belongs thereto. It is then possible to order the cells depending on their utilization probability. The method associates the highest probability cell with the power level sequence $(P_{i,m}(T1+1), \ldots, P_{i,m}(T1+T2))$ for which the sum of the components $\Sigma_{t=T1+1}^{T1+T2} P_{i,m}(t)$ is the highest, i.e. the maximum power level sequence on the band. The method then considers the second cell, as being either the cell of maximum probability or the cell of immediately smaller probability, and associates it with the power level sequence of sum that is immediately smaller, and so on. Thus, the set of power level sequences $(P_{i,m}(T1+1), \ldots, P_{i,m}(T1+T2))$ is ordered in such a manner that the sum $\Sigma_{t=T1+1}^{T1+T2} P_{i,m}(t)$ decreases.

After a subframe has been transmitted, each transmitter i receives over the band m the optionally normalized SINR as returned by its receiver i. The SINRs as estimated and returned on each subframe are written: $\hat{\gamma}_{i,m}(t)$. At the end of the succession of T2 subframes, a transmitter thus has T2 SINR estimates determined by its receiver per band m.

In an implementation, the channels are assumed to be quasi static, so they do not vary over the duration of the transmission. The transmitter i possesses estimates of the channels on which its SNIR depends and the power levels are discrete. The estimation step thus takes place as follows. Knowing $P_{i,m}(t)$ the transmitter i calculates the following quantity:

$$\gamma_{i,m}(x_{i,m}(t)) = \frac{\hat{g}_{ii,m} P_{i,m}(t)}{1 + \sum_{j \neq i} \hat{g}_{ji,m} P_{j,m}(t)} \quad (21)$$

where $x_{i,m}(t) = [P_{1,m}(t), \ldots, P_{i-1,m}(t), P_{i+1,m}(t), \ldots, P_{K,m}(t)]^T$ is the vector of powers associated with the other transmitters. The vector $\underline{x}_{i,m}$ is defined over the entire frame T2 as follows:

$$\underline{x}_{i,m} = [x_{i,m}(T1+1), \ldots, x_{i,m}(T1+T2)]^T$$

The vector $\hat{\underline{\gamma}}_{i,m}$ of the estimated SINRs is defined as follows:

$$\hat{\underline{\gamma}}_{i,m} = [\hat{\gamma}_{i,m}(T1+1), \ldots, \hat{\gamma}_{i,m}(T1+T2)]^T$$

Power levels are estimated by selecting the sequence that is the most likely (in the maximum likelihood sense) i.e. the sequence that maximizes the probability distribution $P(\hat{\underline{\gamma}}_{i,m} | \underline{x}_{i,m})[\underline{x}_{i,m} \in C^{K-1}]$ where [x] is equal to 1 if x is true and otherwise is equal to 0. The Iverson bracket [.] requires each power sequence to belong to the dictionary C of possible sequences (which dictionary is assumed to be the same for each transmitter). A selected sequence corresponds to a cell index, i.e. to decoding.

Consider the vector:

$$\underline{y}_{i,m} = [\gamma_{i,m}(x_{i,m}(T1+1)), \ldots, \gamma_{i,m}(x_{i,m}(T1+T2))]^T$$

If it is assumed that:

$$\underline{\hat{y}}_{i,m} = \underline{y}_{i,m} + \underline{n}$$

with $\underline{n}$ following a Gaussian distribution of covariance that is a multiple of the identity, then, the maximum likelihood estimate is written:

$$\hat{x}_{i,m} = \underset{x_{i,m} \in C^{K-1}}{\operatorname{argmin}} \left\| \underline{\hat{y}}_{i,m} - \underline{y}_{i,m} \right\|^2 \quad (22)$$

$$= \underset{x_{i,m} \in C^{K-1}}{\operatorname{argmin}} \sum_{t=T1+1}^{T1+T2} |\hat{\gamma}_{i,m}(t) - \gamma_{i,m}(x_{i,m}(t))|^2$$

If the number $\hat{K}$ of actual interferers is small (typically one to a few), then the transmitter i can in general approximate its SINR and test exhaustively the $p^{\hat{K}T2}$ possible configurations. Thus, for p=8 power levels, $\hat{K}$=1 dominant interferers and T2=3 subframes, there are 512 configurations to be tested.

In an implementation, the method approximates the SINR while taking account only of a small number of interferers. This approximation comes from a reduction of the model. This reduction consists in selecting a value for $\hat{K}$, e.g. $\hat{K}$=1. The expression for the SINR estimated by the receiver i becomes:

$$\hat{\gamma}_{i,m} = \frac{g_{ii,m} P_{i,m}}{1 + \sum_{j \in \mathcal{V}_{i,m}} g_{ji,m} P_{j,m}}. \quad (23)$$

Only the set $\mathcal{V}_{i,m}$ is considered as having an influence for estimating the SINR. This set comprises the neighborhood of the link ii on the channel m. If there is only one dominant interferer, the set $\mathcal{V}_{i,m}$ of neighbors has only one interferer ($\mathcal{V}_{i,m}$ is a singleton). If the sets $\mathcal{V}_{i,m}$ have different cardinal numbers, then in one implementation, the method takes into consideration only the set $V = \max_{(i,m)} |\mathcal{V}_{i,m}|$, where the notation $|\cdot|$ designates the cardinal number of a set, in the expression for the SINRs estimated by the various receivers.

Returning to the example shown in FIG. 1, the interferer number is V=1, and there is no need to perform model reduction. The number of channels is M=2. Each transmitter is assumed to be in a position to select between sixteen transmission power levels (i.e., $|\mathcal{P}|=p=16$) and each channel coefficient/gain is assumed to have been quantized by any procedure and can take four values that are written $g_{ij,m}^{(1)}, \ldots, g_{ij,m}^{(4)}$.

During the acquisition stage, by setting T1=2, the two transmitters AP1, AP2 transmit simultaneously on each of two channels Ch1, Ch2 a first subframe followed by a second subframe that form a training sequence. For each subframe, the transmitters have knowledge of the power levels used by the other transmitter (training stage). At the end of a subframe, each of the access points receives the SINRs returned by its station. For the two access points AP1 and AP2, the returned SINRs are respectively as follows:

$$\begin{cases} \gamma_{1,1} = \frac{g_{11,1} P_{1,1}}{1 + g_{21,1} P_{2,1}} \\ \gamma_{1,2} = \frac{g_{11,2} P_{1,2}}{1 + g_{21,2} P_{2,2}} \end{cases} \text{ and } \begin{cases} \gamma_2^1 = \frac{g_{22}^1 P_2^1}{1 + g_{12}^1 P_1^1} \\ \gamma_2^2 = \frac{g_{22}^2 P_2^2}{1 + g_{12}^2 P_1^2} \end{cases}$$

At the end of each training sequence for the access point AP1, and for the channel Ch1 (m=1), the linear system (14) of equations to be solved becomes:

$$\begin{cases} P_{1,1}(1) \hat{g}_{11,1} - P_{2,1}(1) \hat{\gamma}_{1,1}(1) \hat{g}_{21,1} = \hat{\gamma}_{1,1}(1) \\ P_{1,1}(2) \hat{g}_{11,1} - P_{2,1}(2) \hat{\gamma}_{1,1}(2) \hat{g}_{21,1} = \hat{\gamma}_{1,1}(2) \end{cases}$$

where $P_{1,1}(1)$ is the power allocated by the transmitter AP1 on the channel Ch1 for the subframe t=1, $P_{2,1}(1)$ is the power allocated by the transmitter AP2 on the channel Ch1 for the subframe t=1, etc. The unknowns of the system are $\hat{g}_{11,1}$ and $\hat{g}_{21,1}$, the other quantities are known to the transmitter AP1.

For the channel Ch2 (m=2), the linear system (14) of equations to solve becomes:

$$\begin{cases} P_{1,2}(1) \hat{g}_{11,2} - P_{2,2}(1) \hat{\gamma}_{1,2}(1) \hat{g}_{21,2} = \hat{\gamma}_{1,2}(1) \\ P_{1,2}(2) \hat{g}_{11,2} - P_{2,2}(2) \hat{\gamma}_{1,2}(2) \hat{g}_{21,2} = \hat{\gamma}_{1,2}(2) \end{cases}$$

where $P_{1,2}(1)$ is the power allocated by the transmitter AP1 on the channel Ch2 for the subframe t=1, $P_{2,2}(1)$ is the power allocated by the transmitter AP2 on the channel Ch2 for the subframe t=1, etc. The unknowns of the system are $\hat{g}_{11,2}$ and $\hat{g}_{21,2}$, the other quantities are known to the transmitter AP1.

For the access point AP1, the relationship (17) for estimating the channel gains becomes:

$$\begin{pmatrix} \hat{g}_{11,m} \\ \hat{g}_{21,m} \end{pmatrix} = (\overline{S_{1,m}} S_{1,m})^{-1} \overline{S_{1,m}} \times \begin{pmatrix} \hat{\gamma}_{1,m}(1) \\ \hat{\gamma}_{1,m}(2) \end{pmatrix} \text{ with}$$

$$S_{1,m} = \begin{pmatrix} P_{1,m}(1) & -\hat{\gamma}_{1,m}(1) P_{2,m}(1) \\ P_{1,m}(2) & -\hat{\gamma}_{1,m}(2) P_{2,m}(2) \end{pmatrix}$$

And for the access point AP2, the system of equations (14) becomes:

$$\begin{cases} P_{2,m}(1) \hat{g}_{22,m} - P_{1,m}(1) \hat{\gamma}_{2,m}(1) \hat{g}_{12,m} = \hat{\gamma}_{2,m}(1) \\ P_{2,m}(2) \hat{g}_{22,m} - P_{1,m}(2) \hat{\gamma}_{2,m}(2) \hat{g}_{12,m} = \hat{\gamma}_{2,m}(2) \end{cases}$$

And the relationship (17) for estimating the channel gains becomes:

$$\begin{pmatrix} \hat{g}_{22,m} \\ \hat{g}_{12,m} \end{pmatrix} = (\overline{S_{2,m}} S_{2,m})^{-1} \overline{S_{2,m}} \times \begin{pmatrix} \hat{\gamma}_{2,m}(1) \\ \hat{\gamma}_{2,m}(2) \end{pmatrix} \text{ with}$$

$$S_{2,m} = \begin{pmatrix} P_{2,m}(1) & -\hat{\gamma}_{2,m}(1) P_{1,m}(1) \\ P_{2,m}(2) & -\hat{\gamma}_{2,m}(2) P_{1,m}(2) \end{pmatrix}$$

During the exchange stage, the parameter T2 is set at one, the estimated gains during the acquisition stage are exchanged during a subframe. The power level coding takes place as follows. For all (ij,m), the possible values for $g_{ij,m}$ are ordered from the lowest to the highest: $g_{ij,m}^{(1)}, \ldots, g_{ij,m}^{(4)}$. Likewise, the power levels are written in such a manner that the sequence $P_{i,m}^{(1)}, \ldots, P_{i,m}^{(16)}$ is an increasing sequence. For the transmitter AP1, the coding $\phi_{1,m}$ is selected as a bijective mapping $(g_{11,m}^{(l_1)}, g_{21,m}^{(l_2)}) \mapsto P_{1,m}^{(l)}$ for $m \in \{1,2\}, l_1 \in \{1, \ldots, 4\}, l_2 \in \{1, \ldots, 4\}, l \in \{1, \ldots, 16\}$. The transmitter AP2 does the same for the two channels Ch1 and Ch2. The transmitter APi observes the power level of the transmitter APj by means of the returned SINRs:

$$P_{j,m} = \frac{P_{i,m} g_{ii,m} - \gamma_{i,m}}{\gamma_{i,m} g_{ji,m}} \qquad (24)$$

The transmitter APi then determines the channel gains of the transmitter APj by applying:

$$(g_{1j,m}, g_{2j,m}) = \phi_{j,m}^{-1}(P_{j,m}) \qquad (25)$$

where $\phi_{j,m}^{-1}$ is the mapping that is the inverse of $\phi_{j,m}$. Thus, the transmitter AP1 determines $g_{12,1}, g_{22,1}, g_{12,2}, g_{22,2}$ and the transmitter AP2 determines $g_{11,1}, g_{21,1}, g_{11,2}, g_{21,2}$.

In an implementation of the method, the method further includes a "power allocation" stage Ph3 during which the K transmitters determine their powers to be transmitted that satisfy a criterion for maximizing the SINRs of the various stations:

$$(P_1^*, \ldots, P_K^*) \in \arg\max_{(P_1, \ldots, P_K) \in \mathcal{P}^{MK}} \sum_{i=1}^{K} \sum_{m=1}^{M} f_{i,m}(\gamma_{i,m}) \qquad (26)$$

where $f_{i,m}$ is a function that defines the performance criterion of the transmitter i, for example:

$$f_{i,m}(x) = \log(1+x). \qquad (27)$$

The simplified structure of a transmitter performing a coordination method of the invention is described with reference to FIG. 4. The transmitter is a portion of a Wi-Fi access point, of a base station in a cellular network, of a femto cell, etc. The transmitter forms a portion of a telecommunications system such as that shown in FIG. 2. The transmitter is in communication with a receiver of the system. The communications channels are described for a frequency band m by direct transmission channel gains $g_{ji,m}$ when j=i and by interfering transmission channel gains $g_{ji,m}$ when j≠i between the transmitter j and the receiver i. The transmitter has an estimate of the direct channel gain and of the interfering channel gains of its receiver.

Figure 3:
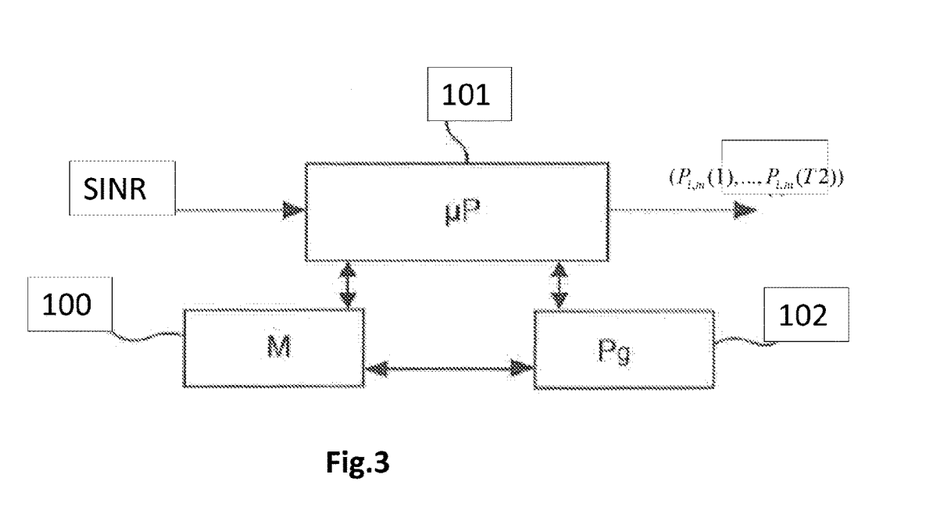
FIG. 3 is a simplified structural diagram for a transmitter of the invention.

Such a transmitter AP1, AP2 comprises a memory module 100 having a buffer memory RAM, a processor unit 101, e.g. provided with a microprocessor μP and controlled by a computer program 102, performing the coordination method of the invention.

On initialization, the code instructions of the computer program 102 may for example be loaded into the RAM prior to being executed by the processor of the processor unit 101. The microprocessor of the processor unit 101 performs the steps of the above-described coordination method, in application of the computer program instructions 102, in order to transmit a frame of T2 subframes at T2 respective power levels $(P_{i,m}(1), \ldots, P_{i,m}(T2))$. As inputs, the processor unit 101 makes use of the estimated channel gains and of the signal to interference plus noise ratios returned by the receiver.

To do this, the transmitter comprises:
  a module for transmitting a sequence of T2 subframes of T2 respective power levels per band m; and
  a module for receiving SINR estimates coming from its receiver.

While the processor of the processor unit 101 is executing code instructions of the computer program 102:
  the processor unit 101 recovers the estimated channel gains $\hat{g}_{ji,m}$, e.g. from the memory module 100;
  the processor unit 101 codes the estimates into a sequence of T2 power levels $(P_{i,m}(1), \ldots, P_{i,m}(T2))$ per band m;
  the transmit module transmits the sequence; and
  the receiver module receives T2 SINR estimates from the receiver.

In an implementation, the method of the invention is used in a context of channel selection by access points AP1, AP2 and stations STA1, STA2 compatible with an IEEE standard 802.11xx, known as Wi-Fi. Regardless of the version under consideration of the Wi-Fi standard, the receiver STA1, STA2 can estimate SINR. The receiver i returns an estimate of this SINR to its respective transmitter via a return channel. The original and still available return channel is the ACK/NACK channel that may be used for coding the SINR on a plurality of bits, where one ACK/NACK represents one bit. Advanced versions of the IEEE 802.11 standard such as IEEE 802.11n et seq. specify a more advanced return channel (of the quantized channel state information (CSI) type, with three of these modes being specified in the version IEEE 802.11n), which may be used for returning SINRs periodically. At the end of the acquisition and exchange stages Ph1 and Ph2, each transmitter can test exhaustively all of the best channel selections.

For example, if there are M=13 possible channels and K=5 active transmitters, that amounts to testing $13^5 = 371293$ possible configurations for the entire system, which is very easily done with present-day technology. By way of example, each transmitter may select the following power super-vector:

$$\underline{x} = [P_{1,1}, \ldots, P_{1,M}, P_{2,1}, \ldots, P_{2,M}, \ldots, P_{k,1}, \ldots P_{K,M}]^T$$

which maximizes the following global performance criterion:

$$G = \sum_{i=1}^{K} u_i \text{ with } u_i = \sum_{m=1}^{M} \log_2(1 + \gamma_{i,m})$$

under the constraints $C_1$, $C_2$ (the SINR being defined as above). The constraint $C_1$ is such that each component of the vector can take only two values (0 or Pmax). The constraint $C_2$ is such that the power allocation vector of a given transmitter can have only one non-zero component.

In a more particular implementation, the method further includes the constraint $C_3$. The constraint $C_3$ is such that a band cannot be allocated to only one transmitter. Under such circumstances, with the constraints $C_1$, $C_2$, $C_3$ the optimum gain $G_{max}$ becomes:

$$G_{max} = \max_{\underline{x} \text{ s.t. } C_1 \cap C_2 \cap C_3} G = \max_{f} \sum_{i=1}^{K} \log(1 + g_{ii,f(i)} P_{max})$$

with s.t. $C_1 \cap C_2 \cap C_3$ meaning under the joint constraints $C_1$, $C_2$, $C_3$. Maximization is performed for all injections $f$ of $\{1, \ldots, K\}$ to $\{1, \ldots, M\}$, i.e. over $$A_K^M = \frac{M!}{(M-K)!} = 154440$$

injections $f$. Selecting such injection amounts to selecting a power vector having components that satisfy the three constraints under consideration. It should be observed that in this particular implementation, each transmitter only requires knowledge of the set of $\{g_{ii,m}\}_{i=1}^K \forall m$.

Figure 4:
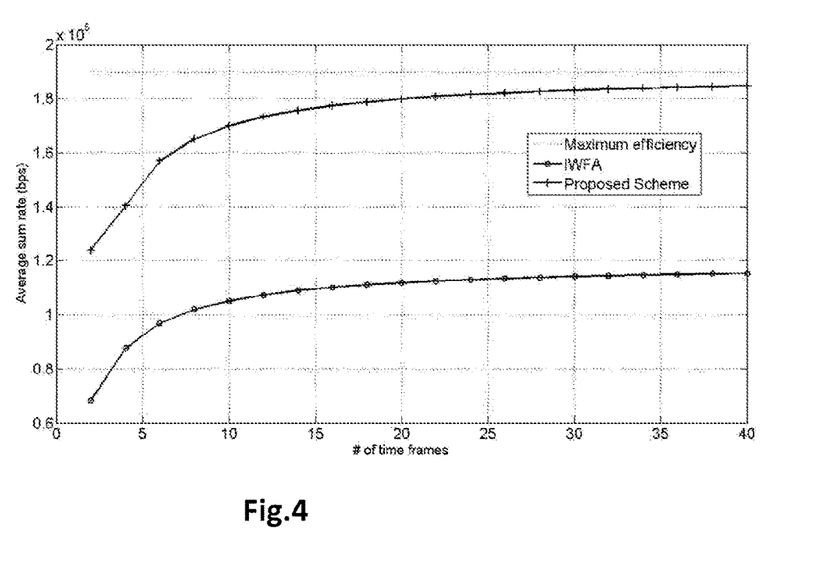
FIG. 4 shows the results of simulation comparing the IWFA method of the prior art and the method of the invention.

Results of simulation are shown in FIG. 4. The simulations were performed using the following configuration parameters:
- the system comprised two transmitters and two receivers;
- the width of a channel was $B_m = 10$ kHz;
- SNR=SINR (in the absence of interference)=40 decibels (dB);
- channel coefficients: $g_{ii,m} = 1$ and $g_{ij,m} = 0.5$ for $i \neq j$; and
- performance criterion in accordance with (5) followed by averaging over the channel coefficients drawn using a Rayleigh distribution.

From the results presented in the form of two curves, one for the IWFA algorithm and another for the method of the invention, it can be seen that the method of the invention makes it possible to come close to the ultimate limit taken as a reference and as obtained with a centralized system. The improvement in transmission rate is about 60% compared with the IWFA solution.

An exemplary embodiment of the present disclosure proposes a technique making it possible to improve coordination between transmitters in a telecommunications system by determining the allocation of powers transmitted by the transmitters so as to minimize interference at the receivers.

REFERENCES

[1]: US 2012/083201 A1
[2]: G. Scutari, D. P. Palomar, and S. Barbarossa, "The MIMO iterative waterfilling algorithm", IEEE Trans. Signal Process., Vol. 57, No. 5, pp. 1917-1935, May 2009.
[3]: Robert M. Gray, David L. Neuhoff, "Quantization", IEEE Trans. on Inf. Theory, 1998

Although the present disclosure has been described with reference to one or more examples, workers skilled in the art will recognize that changes may be made in form and detail without departing from the scope of the disclosure and/or the appended claims.

The invention claimed is:

1. A method comprising:
    coordinating a transmitter with $K-1$ other transmitters in a group of K transmitters, the K transmitters being in communication respectively with K receiving devices via channels that are characterized, for a frequency band m, between a respective one of the K transmitters and its respective receiving device, by a direct transmission channel gain and between the respective one of the K transmitters and each of the receiving devices except its respective receiving device by an interfering transmission channel gain, $K>1$, $m \in \{1, \ldots, M\}$, each of the K transmitters having knowledge of estimates of the direct transmission channel gain with its respective receiving device and of the interfering transmission channel gains affecting its respective receiving device, wherein the coordinating comprises:
    an "exchange" stage comprising, per frequency band m:
    a coding step comprising: each one of the K transmitters using a power level coding to determine a sequence of $T2>1$ subframes of T2 power levels coding the estimated direct transmission channel gain with its receiving device and coding the estimated interfering transmission channel gains affecting its receiving device; each one of the K transmitters transmitting the sequence of $T2>1$ subframes; and receiving by each one of the K transmitters, after each of the $T2>1$ subframes being transmitted, an SINR estimate as returned by its respective receiving device based on observation of a received signal while the K transmitters are simultaneously transmitting each of respective T2 subframes,
    an estimation step comprising each one of the K transmitters estimating each of the T2 power levels transmitted by each one of the K−1 other transmitters using the returned T2 SINR estimates; and
    a decoding step comprising each one of the K transmitters decoding each of the T2 power levels transmitted by each one of the K−1 other transmitters to determine the direct and interfering transmission channel gains coded by the T2 power levels transmitted by each one of the K−1 other transmitters.

2. The method according to claim 1, wherein the coordinating further comprises:
    an acquisition stage of the direct transmission channel gains and the interfering transmission channel gains during which each of the K transmitters transmits a sequence of T1 subframes of T1 respective determined power levels, and during which each of the K transmitters receives, after each of the T1 subframes, an estimation of the SINR returned by its respective receiving device.

3. The method according to claim 2, wherein the number T1 of subframes is equal to K.

4. The method according to claim 2, wherein the number T1 of subframes is equal to K−X, where X is a number of direct and interfering transmission channel gains known to the respective transmitter.

5. The method according to claim 2, wherein the power levels of the sequence of T1 subframes from the respective transmitter are determined under the constraint that a matrix $S_{i,m}$ is pseudo-invertible in the Moore Penrose sense with a probability close to one, the matrix $S_{i,m}$ being:

$$S_{i,m} = \begin{pmatrix} -\hat{\gamma}_{i,m}(1)P_{1,m}(1) & -\hat{\gamma}_{i,m}(1)P_{2,m}(1) & \ldots & P_{i,m}(1) & \ldots & -\hat{\gamma}_{i,m}(1)P_{K,m}(1) \\ -\hat{\gamma}_{i,m}(2)P_{1,m}(2) & -\hat{\gamma}_{i,m}(2)P_{2,m}(2) & \ldots & P_{i,m}(2) & \ldots & -\hat{\gamma}_{i,m}(2)P_{K,m}(2) \\ \vdots & \vdots & & \vdots & & \vdots \\ -\hat{\gamma}_{i,m}(T1)P_{1,m}(T1) & -\hat{\gamma}_{i,m}(T1)P_{1,m}(T1) & \ldots & P_{i,m}(T1) & \ldots & -\hat{\gamma}_{i,m}(T1)P_{K,m}(T1) \end{pmatrix}$$

with $\hat{y}_{i,m}(t)$ being the estimate of the SINR returned by receiving device of index $i \in \{1, \ldots K\}$ of the K receiving devices to its respective transmitter, $P_{i,m}(t)$ being the determined power levels of the sequence of T1 subframes, and $t \in \{1, 2, \ldots, T1\}$.

6. The method according to claim 2, wherein the power levels of the sequence of T1 subframes of a transmitter of index $i \in \{1, \ldots K\}$ of the K transmitters are determined using a random draw until a matrix $\Omega_{i,m}$ is a full rank matrix, the matrix being:

$$\Omega_{i,m} = \begin{pmatrix} P_{1,m}(1) & P_{2,m}(1) & \ldots & P_{i,m}(1) & \ldots & P_{K,m}(1) \\ P_{1,m}(2) & P_{2,m}(2) & \ldots & P_{i,m}(2) & \ldots & P_{K,m}(2) \\ \vdots & \vdots & & \vdots & & \vdots \\ P_{1,m}(T1) & P_{2,m}(T1) & \ldots & P_{i,m}(T1) & \ldots & P_{K,m}(T1) \end{pmatrix}$$

where $P_{i,m}(t)$ are the determined power levels of the sequence of T1 subframes, and $t \in \{1, 2, \ldots, T1\}$.

7. The method according to claim 1, wherein the power level coding is a joint source-channel coding of the space-time type, in which the space dimension corresponds to the number M of channels m, and the time dimension corresponds to the number T2 of subframes.

8. The method according to claim 1, wherein the power level coding is a separate source-channel coding.

9. The method according to claim 1, wherein the SINR is estimated before filtering, the filtering being associated with detecting the received signal.

10. A transmitter for performing a method of coordination with K−1 other transmitters, wherein:
the transmitter is a member with the K−1 other transmitters in a group of K transmitters, the K transmitters being in communication respectively with K receiving devices via channels that are characterized, for a frequency band m between a respective one of the K transmitters and its respective receiving device by a direct transmission channel gain and between the respective transmitter and each of the K receiving devices except its respective receiving device by an interfering transmission channel gain, K>1, m∈ {1, . . . , M},
the transmitter comprising:
a processor which is configured to:
per frequency band m, encode by using a power level code an estimated direct transmission channel gain with its respective receiving device and estimated interfering transmission channel gains interfering with its respective receiving device into a sequence of T2 subframes of T2 respective power levels;
transmit with a transmitter circuit the sequence of T2 subframes per band m;
receive with a receiver circuit per band m after each of the T2>1 subframes being transmitted, an estimated value of an SINR returned by its respective receiving device based on observations of a received signal while the K transmitters are simultaneously transmitting each of respective T2 subframes,
estimate per frequency band m each T2 power levels transmitted by each one of the K−1 other transmitters using the returned T2 estimated values of the SINR, and
decode each of the T2 power levels transmitted by each one of the K−1 other transmitters to determine the direct and interfering transmission channel gains coded by the T2 power levels transmitted by each one of the K−1 other transmitters.

11. A telecommunications system comprising K transmitters, each one of the K transmitters performing a method of coordination with the K−1 other transmitters, the K transmitters being in communication respectively with K receiving devices via channels that are characterized, for a frequency band m between a respective one of the K transmitters and its respective receiving device by a direct transmission channel gain and between the respective one of the K transmitters and each of the K receiving devices except its respective receiving device by an interfering transmission channel gain, K>1, m∈{1, . . . , M}, the respective one of the K transmitters comprising:
a processor which is configured to:
per frequency band m, encode by using a power level code an estimated direct transmission channel gain with its respective receiving device and estimated interfering transmission channel gains interfering with its respective receiving device into a sequence of T2 subframes of T2 respective power levels;
transmit with a transmitter circuit the sequence of T2 subframes per band m; and
receive with a receiver circuit per band m after each of the T2>1 subframes being transmitted, an estimated value of an SINR returned by its respective receiving device based on observation of a received signal while the K transmitters are simultaneously transmitting each of respective T2 subframes,
estimate per frequency band m each T2 power levels transmitted by each one of the K−1 other transmitters using the returned T2 estimated values of the SINR, and
decode each of the T2 power levels transmitted by each one of the K−1 other transmitters to determine the direct and interfering transmission channel gains coded by the T2 power levels transmitted by each one of the K−1 other transmitters.

12. A non-transitory computer-readable data medium including program codes stored thereon and when the program codes are executed in a transmitter of a group of K transmitters, the transmitter performs acts of:
coordinating the transmitter with K−1 other transmitters in the group of K transmitters, the K transmitters being in communication respectively with K receiving devices via channels that are characterized, for a frequency band m between a respective one of the K transmitters and its respective receiving device, by a direct transmission channel gain and between the respective one of the K transmitters and each of the respective receiving devices except its respective receiving device by an interfering transmission channel gain, K>1, m∈{1, . . . , M}, each of the transmitters having knowledge of estimates of the direct transmission channel gain with its respective receiving device and of the interfering transmission channel gains affecting its respective receiving device, wherein the coordinating comprises:
an "exchange" stage comprising, per frequency band m:
a coding step comprising each one of the K transmitters:
using a power level coding to determine a sequence of T2>1 subframes of T2 power levels coding the estimated direct transmission channel gain with its receiving device and coding the estimated interfering transmission channel gains affecting its receiving device;
transmitting the sequence of T2>1 subframes; and receiving, which each of the K transmitters receives, after each of the T2 subframes being transmitted, an SINR estimate as returned by its respective receiving device based on observation of a received signal while the K transmitters are simultaneously transmitting each of respective T2 subframes, an estimation step comprising each of the K transmitters estimating each of the T2 power levels transmitted by each one of the K−1 other transmitters using the returned T2 SINR estimates; and a decoding step comprising each of the K transmitters decoding each of the T2 power levels transmitted by each one of the K−1 other transmitters to determine the direct and interfering transmission channel gains coded by the T2 power levels transmitted by each one of the K−1 other transmitters.

* * * * *

UNITED STATES PATENT AND TRADEMARK OFFICE
CERTIFICATE OF CORRECTION

PATENT NO. : 10,397,881 B2
APPLICATION NO. : 15/100529
DATED : August 27, 2019
INVENTOR(S) : Samson Lasaulce, Vineeth Satheeskumar Varma and Raphael Visoz Page 1 of 1

It is certified that error appears in the above-identified patent and that said Letters Patent is hereby corrected as shown below:

In the Claims

Column 24, Line 61, in Claim 12, cancel the text beginning with "a coding step comprising each one of the K transmitters" to and ending "after each of the T2 subframes being transmitted" in Column 25, Line 2, and insert the following:
--a coding step comprising each one of the K transmitters: using a power level coding to determine a sequence of T2>1 subframes of T2 power levels coding the estimated direct transmission channel gain with its receiving device and coding the estimated interfering transmission channel gains affecting its receiving device; transmitting the sequence of T2>1 subframes; and receiving, after each of the T2 subframes being transmitted--

Signed and Sealed this
Seventh Day of July, 2020

Andrei Iancu
*Director of the United States Patent and Trademark Office*